United States Patent [19]

Takeda et al.

[11] Patent Number: 4,481,415

[45] Date of Patent: Nov. 6, 1984

[54] QUADRUPOLE MASS SPECTROMETER

[75] Inventors: Tsunezo Takeda, Nagaokakyo; Kozo Miseki, Kyoto, both of Japan

[73] Assignee: Shimadzu Corporation, Kyoto, Japan

[21] Appl. No.: 436,971

[22] Filed: Oct. 27, 1982

[51] Int. Cl.$^3$ .............................................. B01D 55/44

[52] U.S. Cl. .................................... 250/292; 250/281

[58] Field of Search ............... 250/281, 283, 292, 294, 250/397, 305

[56] References Cited

U.S. PATENT DOCUMENTS

| | | | |
|---|---|---|---|
| 3,560,734 | 2/1971 | Barnett et al. | 250/292 |
| 3,867,632 | 2/1975 | Fite | 250/292 |
| 3,939,344 | 2/1976 | McKinney | 250/281 |
| 4,227,087 | 10/1980 | Kurz | 250/397 |
| 4,230,943 | 10/1980 | Franzen et al. | 250/292 |
| 4,267,448 | 5/1981 | Feser et al. | 250/283 |

*Primary Examiner*—Bruce C. Anderson

*Attorney, Agent, or Firm*—Fidelman, Wolffe & Waldron

[57] ABSTRACT

A quadrupole mass spectrometer wherein the quadrupole and the ion detector are not in axial alignment with each other, with an exit apertured plate having an exit aperture disposed adjacent the exit end of the quadrupole and an entrance apertured plate having an entrance aperture disposed in front of the ion detector. An electrode in the form of a hollow cylinder or a plate having a circular aperture formed therein is interposed between the exit apertured plate and the entrance apertured plate so that the central axis of the aperture of the electrode is aligned with that of the entrance aperture to the ion detector. A controller is provided to apply a voltage individually to the exit apertured plate and the interposed electrode so that the action of the fringing electric field about the exit end of the quadrupole to cause divergence of the ion beam is substantially suppressed.

9 Claims, 5 Drawing Figures

QUADRUPOLE MASS SPECTROMETER

BACKGROUND OF THE INVENTION

This invention relates to a quadrupole mass spectrometer.

In quadrupole mass spectrometers, one of the important factors that determine the capacity and performance of the instrument is the fringing electric fields produced at the entrance and exit ends of the quadrupole. The fringing fields exert a serious defocusing effect on the ion beam which enters or emerges from the quadrupole so that the ion transmission efficiency and consequently the sensitivity of the instrument are greatly reduced.

There is known a quadrupole mass spectrometer wherein the quadrupole and the ion detector are so arranged that the central axis of the ion detector is not in alignment with but off the central axis of the quadrupole. The "off-axis" arrangement helps prevent the light, X-ray, etc. produced by the ion source from entering the ion detector thereby to produce noise.

SUMMARY OF THE INVENTION

The primary object of the invention is therefore to reduce in a quadrupole mass spectrometer the adverse effect of the fringing field at the exit end of the quadrupole thereby to increase the ion transmission efficiency and hence the sensitivity of the instrument.

Briefly stated, in the qudrupole mass spectrometer of the invention the quadrupole and the ion detector are not in axial alignment with each other. An exit apertured plate having an exit aperture is disposed adjacent the exit end of the quadrupole so that the ion beam transmitted through the quadrupole passes through the exit aperture, and an entrance apertured plate having an entrance aperture is disposed in front of the detector. An electrode in the form of a hollow cylinder or an apertured plate is interposed between the exit apertured plate and the entrance apertured plate in such a manner that the central axis of the electrode coincides with that of the entrance aperture of the entrance apertured palte. A controller is provided to impress a voltage individually on the exit apertured plate and the interposed electrode so that the action of the fringing field adjacent the exit end of the quadrupole to cause divergence of the ion beam can effectively be suppressed.

DESCRIPTION OF THE PREFERRED EMBODIMENT

Figure 1:
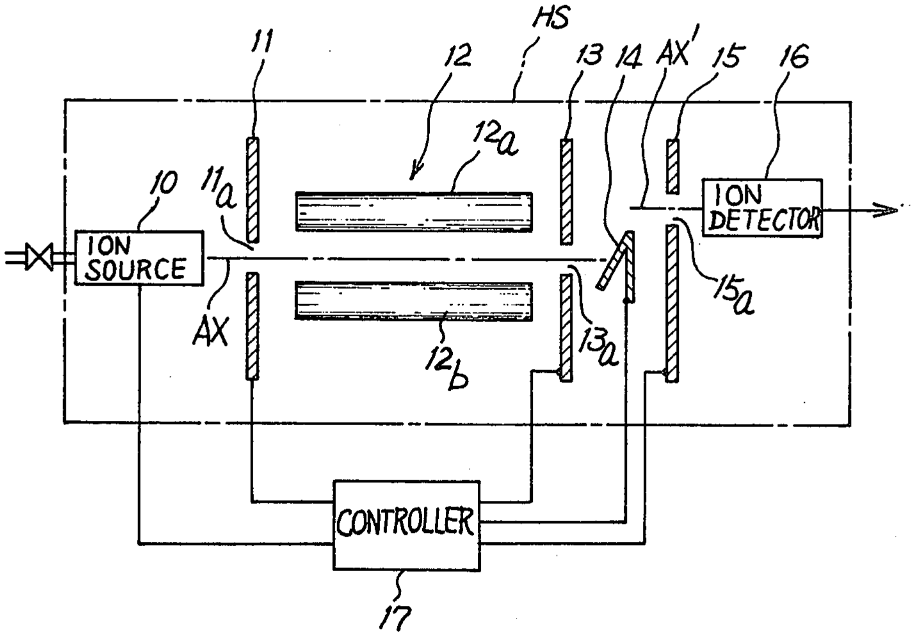
FIG. 1 is a schematic sectional view of a conventional quadrupole mass spectrometer.

Before describing a preferred embodiment of the invention, the typical structure of a conventional quadrupole mass spectrometer as schematically shown in FIG. 1 will first be explained. The mass spectrometer comprises an ion source 10, an entrance apertured plate 11, a quadrupole 12, an exit apertured palte 13, a deflector 14, an entrance apertured plate 15 and an ion detector 16. The component parts are enclosed in a housing HS shown in dot-and-dash line for simplicity of illustration, which is normally evacuated.

As is well known, the quadrupole 12 comprises four electrically conductive cylindrical rods extending parallel to one another and symmetrically disposed at 90° intervals about a central axis AX, with a voltage source being connected to the rods in a known manner. For simplicity of illustration, only two of the four electrode rods are shown at **12*a* and 12*b***, and the voltage source is not shown in the drawing.

The plate 11 has an entrance aperture **11*a* the central axis of which coincides with the central axis AX of the quadrupole 12. The ion beam from the source 10 is injected into the quadrupole 12 through the entrance aperture 11*a* of the plate 11**.

The exit apertured plate 13 has an exit aperture **13*a*, the central axis of which coincides with the central axis AX of the quadrupole 12. The selected ion emerges from the quadrupole through the exit aperture 13*a***.

The entrance apertured plate 15 has an entrance aperture **15*a*, through which the deflected ion beam enters the ion detector 16 arranged behind the entrance aperture 15*a*. The ion detector 16 can be a conventional electron multiplier. The central axis AX' of the entrance aperture 15*a* or the ion detector is displaced laterally from the central axis of the exit aperture 13*a*** and hence the central axis AX of the quadrupole.

The deflector 14 is interposed between the exit and entrance apertured plates 13 and 15, and a controller 17 impresses a suitable voltage of the same polarity as the charged ions on the deflector 14, which deflects the ion beam emerging out of the exit aperture **13*a* toward the entrance aperture 15*a***. The fringing electric field generated at the exit end of the quadrupole, however, causes the ion beam that has passed the stability region through the quadrupole and emerged therefrom to diverge so that the ion transmission efficiency to the detector is reduced. This undesirable influence of the fringing field on the ion beam depends upon the time the ions remain in the fringing electric field, that is, the length of the fringing electric field, the mass of the ion and the voltage to drive the ion beam. Although the deflector deflects the ion beam from the exit to the entrance aperture thereby to help increase the ion transmission efficiency to a certain degree, it has no function to prevent the above-mentioned divergence of the ion beam caused by the fringing field near the exit end of the quadrupole.

Figure 2:
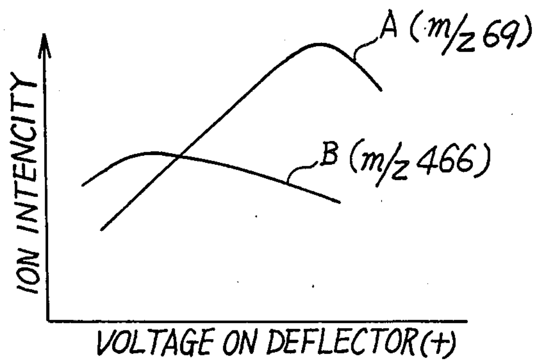
FIG. 2 is a graph showing the relation between the voltage impressed on the deflecting electrode and the intensity of the detected ion in the instrument of FIG. 1.

As previously mentioned, the above-mentioned action of the fringing field increases with the mass of the ion as shown in FIG. 2, wherein the intensity of the ion detected is taken along the abscissa and the voltage impressed on the deflecting electrode is taken along the ordinate.

Curve A results from the ion of a lower mass (m/z 69) and curve B results from the ion of a higher mass (m/z 466). As shown in the graph, the optimum deflecting voltage with which the detected ion intensity becomes highest varies with ions of different masses, and the detected ion intensity varies with ions of different masses, with the sensitivity of detection being generally lower for the ion of the higher mass. In short, the conventional arrangement of FIG. 1 can provide the instrument with only a low ion tansmission efficiency and hence a low sensitivity, which varies with ions of different masses. This invention has been proposed to eliminate the above disadvantages of the conventional arrangement.

Figure 3:
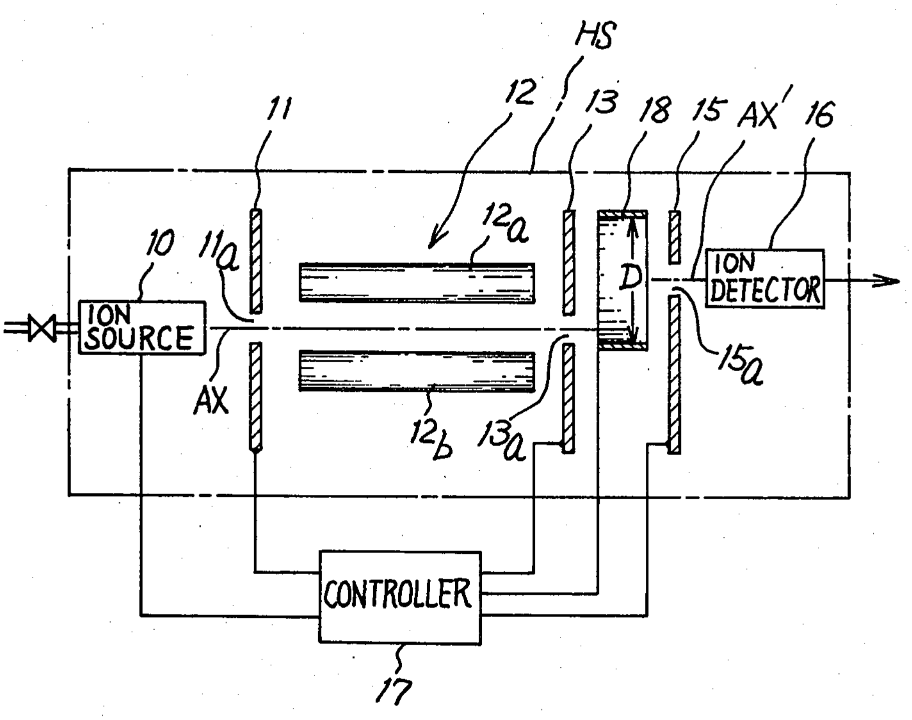
FIG. 3 is a schematic sectional view of a quadrupole mass spectrometer constructed in accordance with a preferred embodiment of the invention.

Referring now to FIG. 3, there is schematically shown a quadrupole mass spectrometer constructed in accordance with the invention. In FIG. 3 the same reference numerals and symbols as in FIG. 1 designate corresponding component parts, so that no explanation of these component parts will be given.

Characteristic of the invention is that in place of the deflector 14 in FIG. 1 a hollow cylindrical electrode 18 is provided between the exit and entrance apertured plates 13 and 15, with the central axis of the electrode 18 being in alignment with the central axis AX' of the entrance aperture 15*a* to the ion detector 16.

The cylindrical electrode 18 may be replaced by an electrode plate having a circular aperture formed therein, the central axis of which is in alignment with the central axis of the entrance aperture 15*a*.

The inner diameter D of the hollow cylindrical electrode 18 or the diameter of the circular aperture of the electrode plate is such that both the exit aperture 13*a* and the entrance aperture 15*a* are within the inner diameter D of the cylindrical electrode 18 or the diameter of the electrode plate. The exit and entrance apertured plates 13 and 15 and the hollow cylindrical electrode 18 can be individually grounded or connected to a suitable controller 17 to apply a desired voltage to each of them.

The voltage impressed on the hollow cylindrical electrode 18 is of the same polarity as that of the charged ions, and the electric field produced by the electrode 18 is influenced by the potential of the exit apertured plate 13 and the dynode potential of the electron multiplier 16. In particular, the electric field near the central axis of the cylindrical electrode 18 depends mostly upon the potential of the exit apertured plate 13 and the dynode potential of the electron multiplier (which is of the opposite polarity to that of the charged ions).

Since the central axis of the hollow cylindrical electrode 18 is off the central axis of the exit aperture 13*a*, the ion beam that has passed through the exit aperture 13*a* is deflected toward the central axis of the cylindrical electrode 18 so as to pass into the entrance aperture 15*a*, with the electric field within the electrode 18 acting to suppress divergence of the ion beam. Thus is accordance with the invention, it is possible to deflect the ion beam while suppressing divergence of the beam, so that the transmission efficiency of the instrument is greatly improved.

Figure 4:
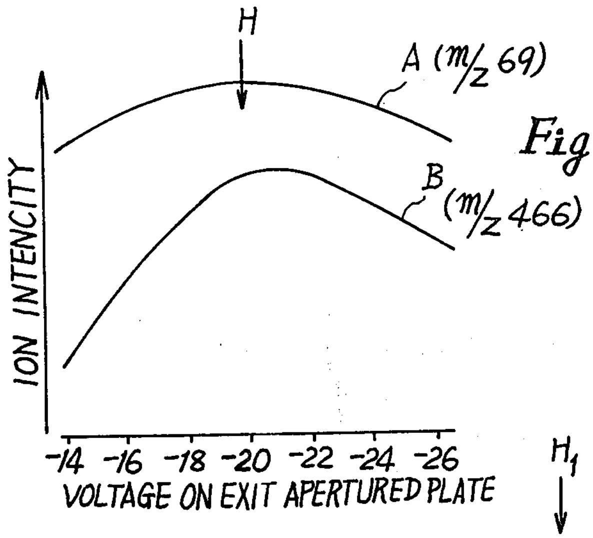
FIG. 4 is a graph showing the relation between the voltage impressed on the exit apertured plate and the intensity of the detected ion in the instrument of FIG. 3.

The arrangement of the invention brings about another advantage. FIG. 4 is a graph showing the intensity of detected ions of different masses plotted against the voltage impressed on the exit apertured plate 13, with the voltage on the hollow cylindrical electrode 18 being kept constant. As clearly shown, the optimum voltages to effect the highest sensitivity of detection are substantially the same as indicated by an arrow H regardless of the difference in mass between the two kinds of ions m/z 69 and m/z 466.

Figure 5:
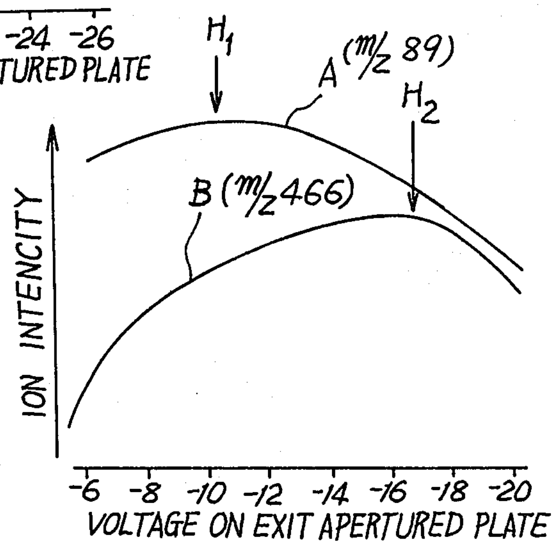
FIG. 5 is a graph similar to FIG. 4 but showing the above-mentioned relation in the instrument of FIG. 1.

For comparison FIG. 5 shows the relation between the voltage impressed on the exit apertured plate 13 and the detected ion intensity in the conventional arrangement of FIG. 1, with the voltage on the deflector 14 being kept at a constant level. The voltage on the exit apertured plate 13 to effect the highest sensitivity varies with the mass number of the ion, as indicated by arrows $H_1$ and $H_2$.

The advantage of the invention that the optimum voltage to be impressed on the exit apertured plate 13 remains unchanged regardless of the mass number of the ion to be detected results from the arrangement of the invention that enables suppression of the action of the fringing electric field produced by the quadrupole to cause divergence of the ion beam. By selecting an appropriate voltage to be applied to the exit apertured plate 13 it is possible to detect each of different kinds of ions having different masses with the highest sensitivity.

With the conventional arrangement, the sensitivity of detection tends to differ with ions of different masses. This tendency has been substantially reduced by the arrangement of the invention.

What we claim is:

1. A quadrupole mass spectrometer comprising: an ion source for producing an ion beam of a sample to be analyzed; an analyzer including a quadrupole through which said ion beam passes; an ion detector having a central axis laterally displaced from the central axis of said quadrupole; means disposed adjacent the exit end of said quadrupole for defining an exit aperture for said ion beam to pass through, the central axis of said exit aperture being aligned with the central axis of said quadrupole; means disposed in front of said ion detector for defining an entrance aperture for said ion beam to pass through to enter said ion detector, the central axis of said entrance aperture being aligned with said central axis of said ion detector; electrode means disposed between said exit aperture defining means and said entrance aperture defining means and having a through hole the central axis of which is in axial alignment with said central axis of said entrance aperture; and means for individually applying a voltage on said exit aperture defining means and said electrode means, so that the action of a fringing field adjacent said quadrapole exit end and causing divergence of said ion beam can effectively be suppressed.

2. The mass spectrometer of claim 1, wherein said exit aperture defining means comprises an electrically conductive plate having an aperture formed therein the cental axis of which is aligned with said central axis of said quadrupole.

3. The mass spectrometer of claim 1, wherein said entrance aperture defining means comprises an electrically conductive plate having an aperture formed therein the central axis of which is aligned with said central axis of said ion detector.

4. The mass spectrometer of claim 1, wherein said electrode means comprises a hollow cylindrical member of an electrically conductive material the cental axis of which is aligned with said central axis of said entrance aperture.

5. The mass spectrometer of claim 4, wherein said hollow cylindrical member has such an inner diameter that both said exit aperture and said entrance aperture are within said inner diameter.

6. The mass spectrometer of claim 1, wherein said electrode means comprises a plate of an electrically conductive material having a circular aperture formed therein the central axis of which is aligned with said central axis of said entrance aperture.

7. The mass spectrometer of claim 6, wherein said circular aperture has such a diameter that both said exit aperture and said entrance aperture are within said inner diameter.

8. The mass spectrometer of claim 1, wherein said ion detector is an electron multiplier.

9. The mass spectrometer of claim 1, wherein said voltage applied to said exit aperture defining means and said electrode means is variable.

* * * * *